April 13, 1954 — G. A. LYON — 2,675,271
WHEEL COVER
Filed Dec. 22, 1948
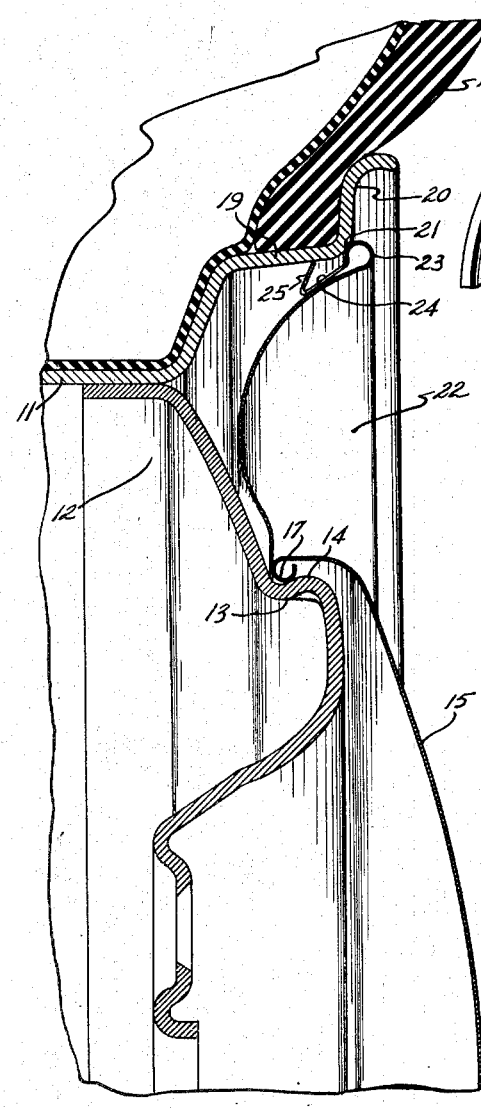
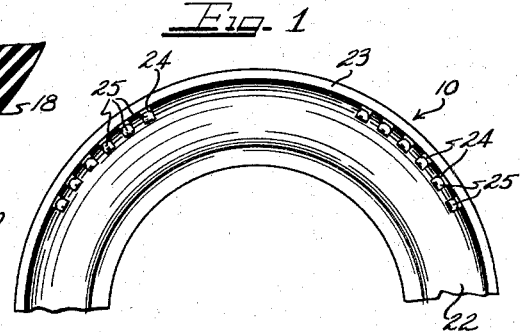
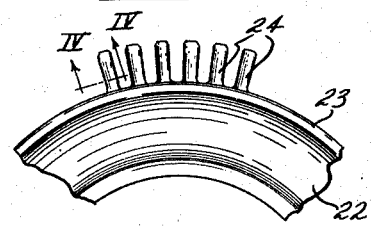
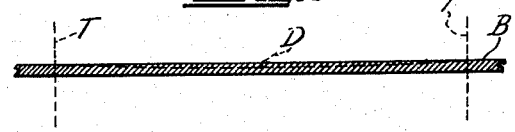
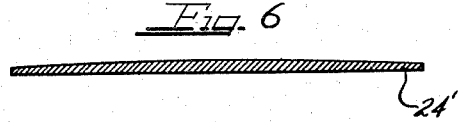
*Inventor*
GEORGE ALBERT LYON Patented Apr. 13, 1954

2,675,271

UNITED STATES PATENT OFFICE 2,675,271

WHEEL COVER

George Albert Lyon, Detroit, Mich.

Application December 22, 1948, Serial No. 66,764

8 Claims. (Cl. 301—37)

The present invention relates to improvements in ornamental and protective wheel covers for the outer sides of vehicle wheels, and more particularly concerns improvements in wheel covers of the self-retaining type wherein the cover is equipped with means for retaining engagement with a part of the wheel.

An important object of the present invention is to provide a wheel cover of the self-retaining type which is equipped with improved retaining means.

Another object of the present invention is to provide a wheel cover of relatively inexpensive construction and in which the material of the body portion comprises a relatively low cost material while integral retaining members on the cover are characterized by a hardness and resilience which is not inherent in the body portion of the cover.

A further object of the invention is to provide a self-retaining cover with retaining elements of improved hardness and resilience.

According to the general features of the invention there is provided a wheel cover of the self-retaining type having marginal retaining elements thereon adapted to engage with a portion of a vehicle wheel, said retaining elements comprising marginal extensions having a surface thereof deformed relative to the opposite surface thereof and being substantially harder and more resilient than the remainder of the cover.

According to other general features of the invention there is provided a vehicle wheel cover of the self-retaining type having thereon integral cover retaining extension elements formed in one piece therewith and coined to a greater hardness and resilience than the inherent hardness and resilience of the remainder of the material of the cover.

Other objects, features and advantages of the present invention will be readily apparent from the following detailed description of certain preferred embodiments thereof taken in conjunction with the accompanying drawings, in which:

Figure 1 is a fragmentary rear elevational view of a wheel cover member embodying features of the invention;

Figure 2 is a radial sectional detail view showing the cover applied to a vehicle wheel;

Figure 3 is a fragmentary front face elevational view of a wheel cover blank showing the same prior to completion of the retaining elements thereof;

Figure 4 is an enlarged sectional view taken substantially on the line IV—IV of Figure 3;

Figure 5 is a sectional view through a sheet metal blank and illustrating steps in the formation of one of the retaining elements of the cover; and Figure 6 is a sectional view similar to Figure 4 but showing a modified form of cover retaining element.

As shown on the drawings:

A wheel cover 10, according to the present invention, is of the self-retaining type and is adapted to be applied to a vehicle wheel including a tire rim 11 supported by a wheel body 12, the latter being in the present instance of the type which is formed with an intermediate radially facing annular shoulder 13 having a series of cover retaining outwardly projecting bumps 14 by which a cover member such as a hub cap 15 is adapted to be applied to the wheel by having a marginal reinforcing bead 17 snapped over and behind the bumps into retained relation on the wheel. The tire rim is of the multi-flanged drop center type adapted for supporting a pneumatic tire and tube assembly 18 and is formed with a generally axially outwardly extending intermediate flange 19 which joins a terminal flange 20 on a rounded shoulder 21. In the present instance the cover member 10 is in the form of a trim ring of a magnitude and extent to substantially conceal the outer side of the tire rim 11 and the portion of the wheel body 12 radially outwardly from the shoulder 13. It will be obvious, however, that the cover 10 could, if desired, be formed as a wheel disk adapted to substantially enclose the entire outer side of the wheel, including the hub cap 15 as an integral part thereof.

The cover 10 comprises a body portion 22 in the present instance of generally concave cross-section. At the radially outer margin of the body portion 22 an underturned marginal reinforcing bead 23 is provided which in the assembled condition of the cover with the wheel is adapted to bear against the tire rim shoulder 21.

Extending generally axially inwardly and biased radially inwardly behind the outer margin of the cover and integral in one piece with the inner edge of the bead 23 is a plurality of cover retaining elements 24 in the present instance in the form of angularly shaped retaining fingers each of which has a terminal retaining flange 25 that extends generally radially outwardly and with an axially outward bias and is engageable at its tip retainingly with the inner face of the tire rim intermediate flange 19. As best seen in Figure 1, the retaining fingers 24 are preferably provided in spaced groups of a plurality of individual fingers, in the present instance shown as six fingers in each group and with the groups spaced about the periphery of the cover. In the form shown there are four retaining finger groups on the cover, although there may be a larger or smaller number of the finger groups and there may be a larger or smaller number of fingers in each group, the illustrated form being understood to be merely exemplary of one form that the cover may take.

According to the present invention important economies are effected in the cover 10 by making the same from a relatively inexpensive sheet metal that may be possessed of fairly low inherent resiliency and may be comparatively soft so that it can be very easily worked. Thus economy is effected not only by the use of an inexpensive material but also in reduced cost in manufacture by reduction in power consumption in the drawing die operations and reduction in die upkeep cost. In addition, softer material can be drawn more speedily and thus increases the rate of production.

However, in order to have the cover self-retaining on the wheel, the retaining elements 24 must be possessed of a relatively high degree of hardness and resilience in order to maintain an efficient wedging, frictional retaining grip upon the portion of the wheel against which applied, in this instance against the tire rim intermediate flange 19. Not only must the retaining elements 24 be possessed of resilience to permit generally jackknife springing of the body and terminal portions thereof, but the terminal gripping portions 25 must have adequate stiffness to resist deformation when subjected to radially inward pressure and stress upon applying the cover to the wheel, which is accomplished by generally centering the cover on the wheel and then pressing it axially inwardly into the fully mounted condition on the wheel. Furthermore, it is desirable to have the retaining elements of such inherent strength that the cover can be removed from the wheel when desired by prying the same off as by applying a pry-off tool such as a screwdriver between the marginal reinforcing bead 23 and the tire rim shoulder 21 and forcing the cover axially outwardly, as well as radially, to loosen and release the terminal flanges 25 of the retaining fingers from their gripping engagement with the tire rim flange 19. Unless the retaining fingers are of adequate strength to resist deformation and damage, the cover cannot be reused efficiently.

By the present invention not only is it possible to make the body of the cover from an inexpensive, relatively soft material but the retaining elements 24 are of a highly resilient, hardened and damage resistant structure. This is accomplished by subjecting those areas of the cover blank which are to form the retaining elements 24 to a localized hardening process which renders the same adequately hard and resilient for the intended service. Such localized hardening is efficiently accomplished by a coining operation wherein the metal in the selected areas is worked to compact and realign the grain structure thereof to render the material harder and more resilient than the original material and the remainder of the cover member.

Having reference to Figure 5, the localized areas of the blank B from which the cover is made and which are to serve as the retaining elements are subjected to a deforming pressure by which one face of the blank is depressed, as indicated by the dash line D, while the remaining face of the blank may be retained in its original plane. As a result of this deforming, coining operation the metal in the coined areas is worked and the structure thereof hardened and rendered substantially more resilient than originally possessed by the metal. After the coining operation the excess material of the blank is trimmed on lines T to leave the appropriate coined retaining element areas. In the final trimmed condition of the blank, and before the fingers have been bent to angular shape, the retaining elements project radially therefrom as shown in Figure 3 and each of the retaining elements, as best seen in Figure 4, has a cross-sectional formation wherein at least the central portion is substantially thinner by reason of the coining pressure applied thereto than the original thickness of the blank and thinner than the remainder of the material of the finished cover member. In the form shown in Figure 4, the results of the coining operation are evident in a relatively large radius concave deformation of one face of the retaining element 24 while the remaining face remains in the original flat plane of the material. As shown in Figure 6 the coining operation may be accomplished by pressing the margins of the coined area thinner while retaining the center of the area at approximately the same thickness as the original material. In either instance, whether the finger is of the cross-sectional shape of the finger 24 in Figure 4 or of the centrally hump cross-sectional shape of the finger 24' of Figure 6, the material thereof will have been realigned, compacted and substantially stiffened and rendered more resilient to be thoroughly effective for the cover retaining purpose of the retaining finger.

While the retaining elements 24 have been shown as in the form of angular retaining fingers, it will be evident that the retaining elements could also take other forms while nevertheless taking advantage of the improvements of the present invention.

The present application is a continuation in part of my copending application Serial No. 764,356, filed July 29, 1947, and forfeited in favor of the present application.

I claim as my invention:

1. In a wheel structure including a tire rim of the multi-flanged drop center type and a load sustaining body portion, a cover for the outer side of the wheel including a circular cover member of a size to substantially cover the tire rim and at least a portion of the body part and in particular the juncture area between the body part and the tire rim, the cover having an outer peripheral marginal underturned bead engageable against the outer side of the tire rim adjacent to a shoulder juncture of said outer side with a generally axially extending intermediate flange, the bead having extending therefrom return bent biting finger extensions including portions extending angularly from juncture with the bead disposed offset toward the body of the cover member relative to the rim-contacting portion of the bead generally axially inwardly and radially inwardly clear of said shoulder and biting finger extremity portions extending generally radially outwardly and slightly axially outwardly at the inner extremities of the first mentioned portions into retaining engagement with said intermediate flange.

2. In a wheel structure including a tire rim of the multi-flanged drop center type and a load sustaining body portion, a cover for the outer side of the wheel including a circular cover member of a size to substantially cover the tire rim and at least a portion of the body part and in particular the juncture area between the body part and the tire rim, the cover having an outer peripheral marginal underturned bead engageable against the outer side of the tire rim adjacent to a generally axially extending intermediate flange, the bead having extending integrally in one piece therefrom return bent biting finger extensions including portions extending from the bead generally axially inwardly and radially inwardly and biting finger extremity portions extending generally radially outwardly and slightly axially outwardly at the inner extremities of the first mentioned portions into retaining engagement with said intermediate flange, the juncture of the retaining fingers with the bead being disposed offset toward the body of the cover member relative to the portion of the bead which engages the tire rim and said portions of the fingers which extend from the bead backing against the opposing inner side of the cover.

3. In a wheel structure including a tire rim of the multi-flanged drop center type and a load sustaining body portion, a cover for the outer side of the wheel including a circular cover member of a size to substantially cover the tire rim and at least a portion of the body part and in particular the juncture area between the body part and the tire rim, the cover having an outer peripheral marginal underturned bead engageable against the outer side of the tire rim adjacent to a generally axially extending intermediate flange, the bead having extending therefrom return bent biting finger extensions including portions extending from the bead generally axially inwardly and radially inwardly and biting finger extremity portions extending generally radially outwardly and slightly axially outwardly at the inner extremities of the first mentioned portions, the portions of the fingers which join the bead being disposed offset toward the body of the cover member relative to the rim-engaging portion of the bead and lying against the adjacent portion of the body of the cover whereby to back up the fingers and enhance the retaining engagement thereof with the tire rim.

4. In a vehicle wheel cover adapted for disposition on the outer side of a vehicle wheel including a multi-flanged tire rim and a load sustaining body part, the cover including an annular member of generally concave cross section and adapted to engage at its inner margin with the wheel body and at its outer margin with the tire rim, said outer margin having an underturned bead portion having a plurality of reversely bent tire rim engaging fingers extending from its inner edge and with their junctures disposed offset toward the body of the cover member relative to the axially innermost peripheral portion of the bead which is located in maximum spaced relation to the juncture of the bead with the cover member.

5. In a vehicle wheel cover adapted for disposition on the outer side of a vehicle wheel including a multi-flanged tire rim and a load sustaining body part, the cover including an annular member of generally concave cross section and adapted to engage at its inner margin with the wheel body and at its outer margin with the tire rim, said outer margin having an underturned portion including a plurality of reversely bent tire rim engaging fingers, said fingers each including an intermediate portion resting against the axially inner side of the cover member and a terminal portion extending generally radially outwardly from the radially inner extremity of the intermediate portion.

6. In a wheel cover of the character described, a formation at the outer margin thereof adapting the same to be secured to a tire rim, said formation including an axially and radially inwardly curled bead having the edge disposed adjacent the inner face of the cover, and a series of tire rim engaging fingers extending from said edge and each including a portion lying against the inner face of the cover member and extending generally radially inwardly and an integral generally radially outwardly divergent tire rim engaging extremity portion of ample resilience to accommodate it to the tire rim but stiff enough to maintain a strong biting engagement with the tire rim.

7. In a vehicle cover adapted for disposition on the outer side of a vehicle wheel, the cover including a marginal portion having at the inner side thereof an underturned portion from which extends a plurality of wheel engaging fingers, said fingers having body portions and terminal portions adapted for retaining engagement with a wheel part, said cover body having a portion thereof convexly related to said finger body portions and said finger body portions engaging said convexly related portion tangentially, whereby the finger bodies are backed up by said engagement.

8. In a cover structure for an automobile wheel, a cover comprising a circular sheet metal body with a turned annular edge having projected therefrom axially rearward of the cover a plurality of resilient cover retaining fingers, each of said fingers including an angular extremity inclined radially and axially with respect to the normal plane of the cover and having the metal thereof deformed lengthwise of at least one side face of the finger into a bowed and substantially harder and more resilient cross section throughout substantially the length of the axially and radially extending finger extremity for augmenting its cover retaining characteristic.

References Cited in the file of this patent

UNITED STATES PATENTS

| Number | Name | Date |
|---|---|---|
| 1,183,466 | Kimmel | May 16, 1916 |
| 2,361,202 | Hodgkins | Oct. 24, 1944 |
| 2,368,228 | Lyon | Jan. 30, 1945 |

FOREIGN PATENTS

| Number | Country | Date |
|---|---|---|
| 582,185 | Great Britain | Nov. 7, 1946 |